US012606003B2

(12) United States Patent
Miyazaki

(10) Patent No.:  US 12,606,003 B2
(45) Date of Patent:        Apr. 21, 2026

(54) VEHICLE DUCT WITH HIGH RIGIDITY PORTION

(71) Applicant: SUBARU CORPORATION, Tokyo (JP)

(72) Inventor: Takefumi Miyazaki, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 283 days.

(21) Appl. No.: 18/535,298

(22) Filed: Dec. 11, 2023

(65) Prior Publication Data

US 2024/0208317 A1      Jun. 27, 2024

(30) Foreign Application Priority Data

Dec. 27, 2022    (JP) ................................. 2022-209323

(51) Int. Cl.
B60K 1/04          (2019.01)
B60K 11/06         (2006.01)
B60K 1/00          (2006.01)

(52) U.S. Cl.
CPC ................ B60K 1/04 (2013.01); B60K 11/06 (2013.01); *B60K 2001/005* (2013.01); *B60K 2001/0416* (2013.01); *B60K 2001/0433* (2013.01); *B60K 2001/0438* (2013.01)

(58) Field of Classification Search
CPC .............. B60K 1/04; B60K 2001/0416; B60K 2001/0433; B60K 2001/0438; B60K 2001/005; B60Y 2306/01; B60L 50/66
See application file for complete search history.

(56) References Cited

U.S. PATENT DOCUMENTS

| | | | |
|---|---|---|---|
| 9,259,998 B1* | 2/2016 | Leanza ................... | B62D 25/20 |
| 2015/0096816 A1* | 4/2015 | Pham ...................... | B60L 58/27 |
| | | | 180/68.2 |
| 2017/0267059 A1* | 9/2017 | Koyama .............. | B62D 27/065 |
| 2018/0015806 A1* | 1/2018 | Yasuda ................... | B60L 58/26 |
| 2018/0075996 A1* | 3/2018 | Narisawa ............... | H01H 85/25 |
| 2021/0094401 A1* | 4/2021 | Hara ................... | H01M 50/242 |

FOREIGN PATENT DOCUMENTS

| JP | 2021-11221 A | 2/2021 |
|---|---|---|

* cited by examiner

*Primary Examiner* — Timothy Hannon
(74) *Attorney, Agent, or Firm* — TROUTMAN PEPPER LOCKE LLP

(57)                ABSTRACT

A vehicle includes a battery, a cross member, and a duct. The cross member is provided rearward of the battery to extend in a left-right direction of the vehicle. The duct is configured to circulate air inside and outside the battery. The duct includes a high rigidity portion located rearward of the cross member and having a rigidity higher than a rigidity of another portion of the duct.

6 Claims, 5 Drawing Sheets

UP

RIGHT ← → LEFT

DOWN

VEHICLE DUCT WITH HIGH RIGIDITY PORTION

CROSS-REFERENCE TO RELATED APPLICATION

The present application claims priority from Japanese Patent Application No. 2022-209323 filed on Dec. 27, 2022, the entire contents of which are hereby incorporated by reference.

BACKGROUND

The disclosure relates to a vehicle including a battery.

Conventionally, there has been proposed a vehicle in which a battery is mounted below a rear seat and an impact absorbing member for absorbing rear collision energy from the rear is provided (for example, Japanese Unexamined Patent Application Publication No. 2021-11221).

SUMMARY

An aspect of the disclosure provides a vehicle including a battery, a cross member, and a duct. The cross member is provided rearward of the battery to extend in a left-right direction of the vehicle. The duct is configured to circulate air inside and outside the battery. The duct includes a high rigidity portion located rearward of the cross member and having a rigidity higher than a rigidity of another portion of the duct.

Accordingly, in the vehicle, the high rigidity portion comes into contact with the cross member and is crushed in an event of a rear end collision, and hence collision energy in the event of the rear end collision can be consumed by the crushing of the high rigidity portion.

BRIEF DESCRIPTION OF THE DRAWINGS

The accompanying drawings are included to provide a further understanding of the disclosure and are incorporated in and constitute a part of this specification. The drawings illustrate an embodiment and, together with the specification, serve to describe the principles of the disclosure.

DETAILED DESCRIPTION

It is desirable to further improve safety in an event of a rear end collision in the vehicle in which the battery is mounted below the rear seat.

It is desirable to improve safety of a vehicle.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Figure 1:
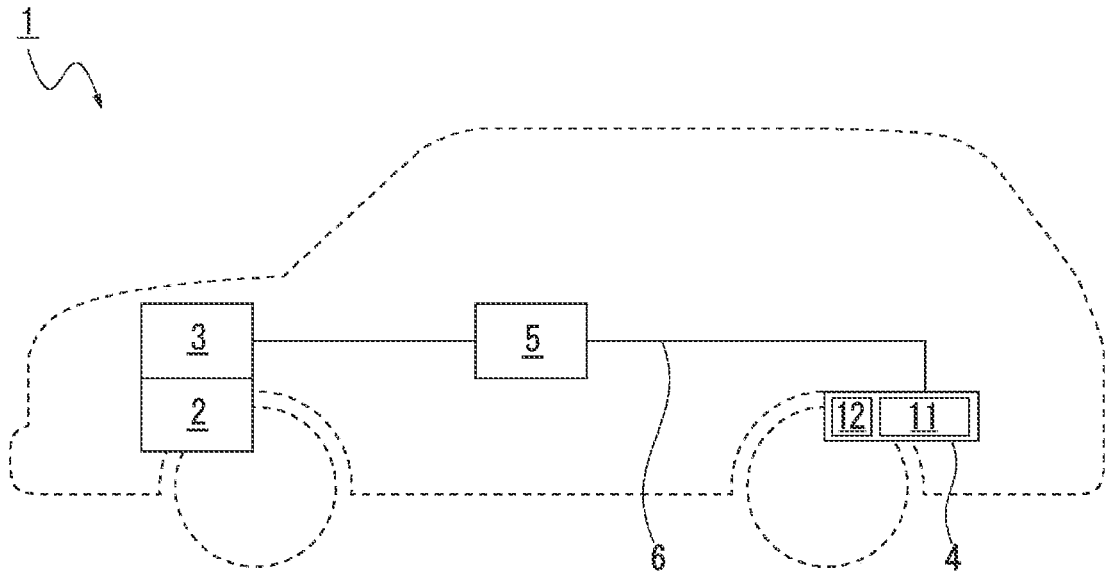
FIG. 1 is a diagram illustrating an outline of a configuration of a vehicle.

FIG. 1 is a diagram illustrating an outline of a configuration of a vehicle 1 according to the embodiment of the disclosure. Description is given below while assuming that a traveling direction of the vehicle 1 is a front direction, a backward direction of the vehicle 1 is a rear direction, a right side with respect to the traveling direction of the vehicle 1 is a right direction, a left side with respect to the traveling direction of the vehicle 1 is a left direction, a vertically upper side is an upward direction, and a vertically lower side is a downward direction.

As illustrated in FIG. 1, the vehicle 1 is a hybrid vehicle including an engine 2, a motor 3, a battery pack 4, an inverter 5, and a power transmission cable 6. The battery pack 4 accommodates a battery 11 and an electronic component 12 such as a battery control unit (BCU).

The engine 2 and the motor 3 are power sources for causing the vehicle 1 to travel. Alternatively, the vehicle 1 may be an electric vehicle including the motor 3 as a power source.

The vehicle 1 is, for example, an all wheel drive automobile in which the power from the engine 2 and the motor 3 serving as the power sources is transmitted to front wheels via a transmission, a front differential gear, and the like, and is transmitted to rear wheels via the transmission, a propeller shaft, a rear differential gear 8 (see FIG. 3), and the like.

The engine 2 is, for example, a horizontally-opposed engine in which a pair of cylinder groups are horizontally opposed to each other in the left-right direction with a crankshaft interposed. The engine 2 causes a piston to reciprocate by combustion pressure obtained by combusting a gaseous mixture of gasoline and air in the cylinders. The engine 2 obtains power by rotating the crankshaft coupled to the piston via a connecting rod. Alternatively, the engine 2 may be an inline engine, a V engine, or the like. Still alternatively, the engine 2 may be a diesel engine.

The motor 3 is, for example, a three-phase alternating current motor. The motor 3 generates power by electric power supplied from the battery 11 via the power transmission cable 6 and the inverter 5.

Moreover, the motor 3 generates electricity (electric power) by performing a regenerative operation. The electricity generated by the regenerative operation of the motor 3 is supplied to the battery 11 via the inverter 5 and the power transmission cable 6.

The inverter 5 converts a direct current supplied from the battery 11 into a three-phase alternating current, and supplies the alternating current to the motor 3 via the power transmission cable 6. When the motor 3 performs the regenerative operation, the inverter 5 converts an alternating current supplied from the motor 3 into a direct current, and supplies the direct current to the battery 11 via the power transmission cable 6.

The battery 11 is a high-voltage secondary battery, and can store electricity to be supplied to the motor 3. The battery 11 is charged by the regenerative operation of the motor 3. The battery 11 may be also charged with electricity supplied from an external device (not illustrated).

The electronic component 12 includes the BCU. The BCU is constituted by, for example, an electronic control unit (ECU), monitors the state of the battery 11, and controls the operation of the battery 11. Sensors that measure the current, voltage, and temperature of the battery 11 are connected to the BCU, and the BCU acquires measurement results from these sensors. The BCU transmits the measurement results acquired from the sensors to another ECU, and controls the operation of the battery 11 based on the measurement results acquired from the sensors or an instruction from another ECU.

Figure 2:
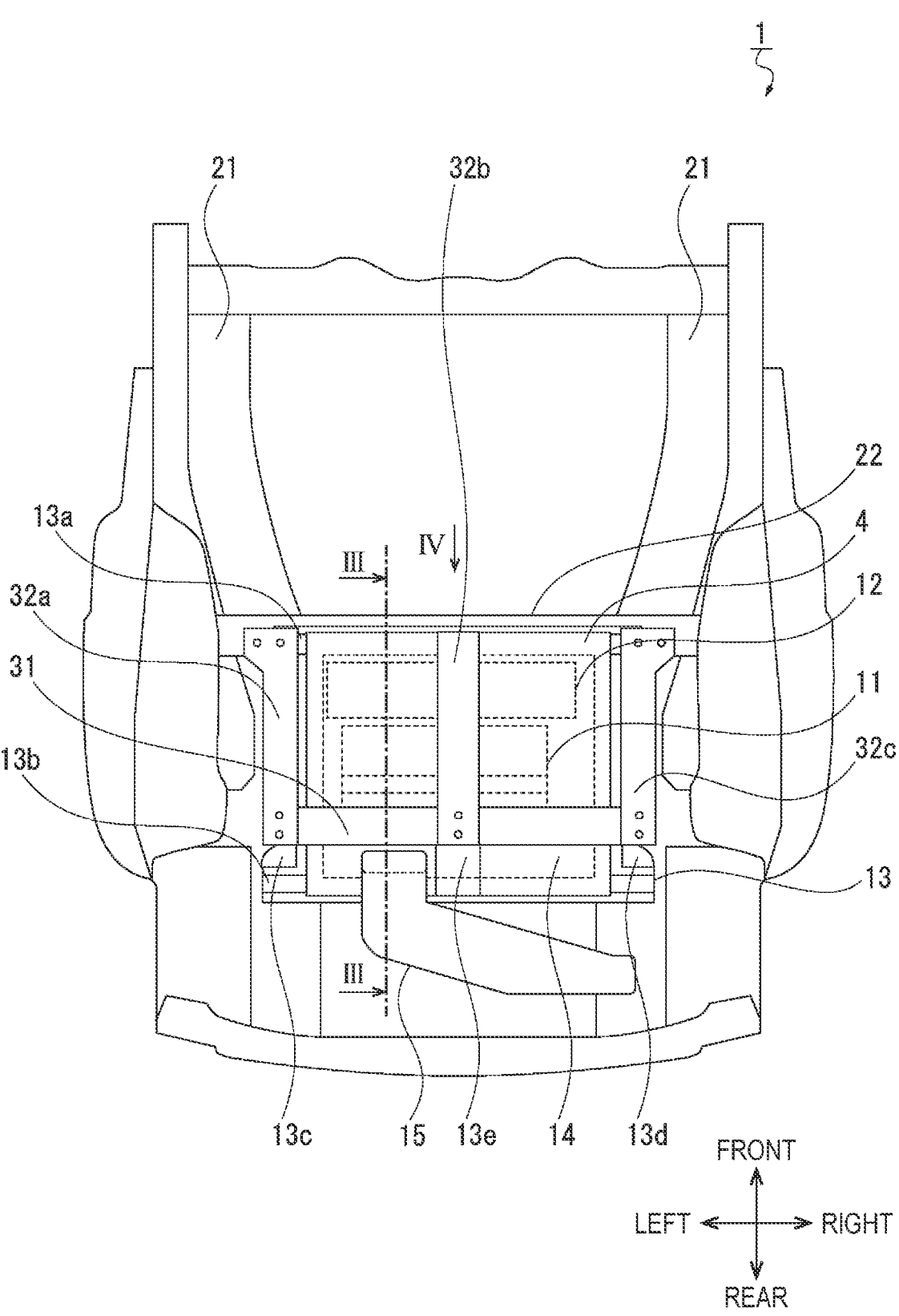
FIG. 2 is a top view of the periphery of a battery.
Figure 3:
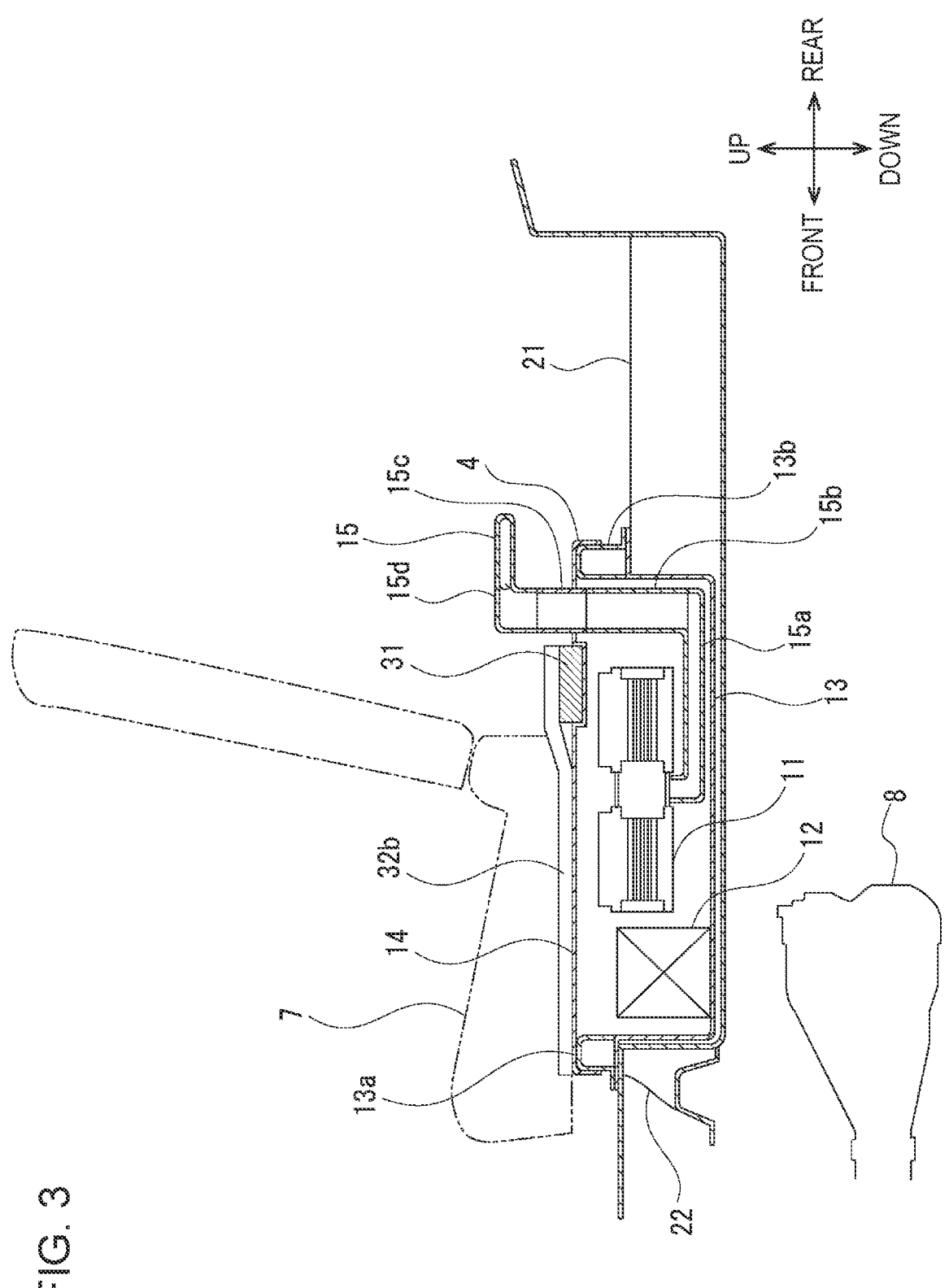
FIG. 3 is a cross-sectional view taken along line III-III in FIG. 2.
Figure 4:
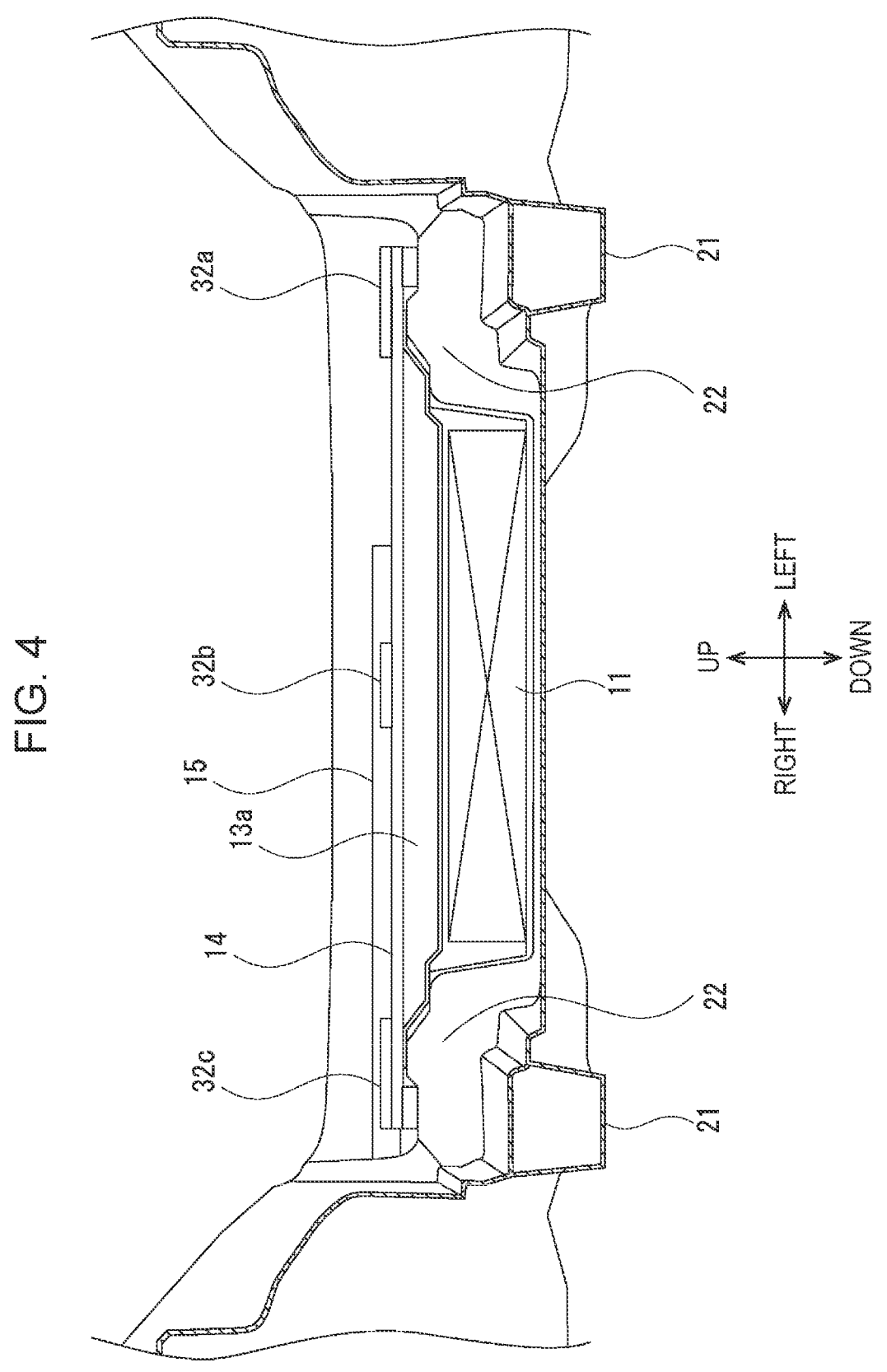
FIG. 4 is a view seen in direction IV in FIG. 2.

FIG. 2 is a top view of the periphery of the battery 11. FIG. 3 is a cross-sectional view taken along line III-III in FIG. 2. FIG. 4 is a view seen in direction IV in FIG. 2. FIGS. 2 and 4 omit the illustration of a rear seat 7.

As illustrated in FIGS. 2 to 4, the battery pack 4 (battery 11) is disposed below the rear seat 7 and above the rear differential gear 8. The rear seat 7 is, for example, the rearmost seat among three rows of seats.

Since the battery pack 4 is disposed at this position, a space for disposing the propeller shaft and the rear differential gear 8 is formed in the vehicle 1, and all wheel drive can be implemented. Moreover, in the vehicle 1, a space for disposing a fuel tank can be secured, and the size of the fuel tank can be increased.

In contrast, when the battery pack 4 is disposed below the rear seat 7, and when the vehicle 1 is collided from the rear, the battery 11 may be damaged by the collision.

Thus, in the vehicle 1, the structure in the periphery of the battery 11 is as follows. The vehicle 1 is provided with a pair of vehicle body frames 21 to extend in the front-rear direction. The pair of vehicle body frames 21 are provided to be spaced apart from each other in the left-right direction (width direction), and have a high rigidity to receive vibration, torsion, bending, and the like applied to the vehicle 1.

Moreover, the vehicle 1 is provided with a vehicle body cross member 22 below the rear seat 7 in the front-rear direction to extend in the left-right direction so as to be bridged between the pair of vehicle body frames 21. The vehicle body cross member 22 is formed such that both end portions in the left-right direction are high and a central portion in the left-right direction is lower than both end portions.

Similarly to the vehicle body frames 21, the vehicle body cross member 22 has a high rigidity to receive vibration, torsion, bending, and the like applied to the vehicle 1.

The battery pack 4 includes a battery case 13, a lid 14, and an exhaust duct 15 in addition to the battery 11 and the electronic component 12 described above.

The battery case 13 is formed in a recessed shape whose upper portion is open, is provided with ribs 13a to 13d over the entire circumference of the opening, and is provided with a rib 13e at the center in the left-right direction to extend in the front-rear direction. The battery 11, the electronic component 12, and the like are accommodated in the battery case 13.

The ribs 13a and 13b are disposed to extend in the left-right direction, and the ribs 13c, 13d, and 13e are disposed to extend in the front-rear direction. The rib 13c is disposed along the left vehicle body frame 21, and the rib 13d is disposed along the right vehicle body frame 21.

The battery pack 4 is open in a substantially rectangular shape as a whole by the ribs 13a, 13b, 13c, and 13d being coupled.

The ribs 13a to 13e are made of, for example, a metallic material such as aluminum, and each have a substantially U-shaped cross section so as to be open downward, thereby increasing the rigidity. In the battery pack 4, the rib 13a is placed on the vehicle body cross member 22, the rib 13b is bridged between the pair of vehicle body frames 21, the rib 13c is placed on the left vehicle body frame 21, and the rib 13d is placed on the right vehicle body frame 21. Thus, the battery pack 4 as a whole is supported by the vehicle body (the vehicle body frames 21 and the vehicle body cross member 22).

The battery pack 4 is fixed by fastening the ribs 13a, 13b, 13c, and 13d to the vehicle body frame 21 and the vehicle body cross member 22 with fastening bolts or the like (not illustrated).

The lid 14 is provided on the battery case 13 so as to close the opening of the battery case 13, and is fixed to the ribs 13a to 13e with fastening bolts or the like (not illustrated).

The exhaust duct 15 is an example of a duct for circulating air inside and outside the battery 11. The exhaust duct 15 has one end coupled to a lower portion of the battery 11, and the other end being open to the outside of the vehicle 1. In the exhaust duct 15, a battery coupling portion 15a, a low rigidity portion 15b, a high rigidity portion 15c, and an external piping portion 15d are coupled so as to be continuous.

The battery coupling portion 15a is disposed on a slightly left side of the center in the left-right direction inside the battery case 13 to extend in the front-rear direction. The battery coupling portion 15a has one end coupled to the lower portion of the battery 11, and the other end coupled to a lower end of the low rigidity portion 15b.

The low rigidity portion 15b is disposed on the rearmost side in the battery case 13 to extend in the up-down direction. The low rigidity portion 15b has the lower end coupled to the battery coupling portion 15a, and an upper end coupled to the high rigidity portion 15c.

The low rigidity portion 15b is formed of, for example, a resin having a rigidity lower than the rigidity of the high rigidity portion 15c. The low rigidity portion 15b has a rigidity lower than the rigidity of the battery 11.

The low rigidity portion 15b is disposed so as to overlap the battery 11 in the up-down direction.

The high rigidity portion 15c is disposed to extend in the up-down direction so as to be continuous with the low rigidity portion 15b. The high rigidity portion 15c is disposed from the inside of the battery case 13 to the outside of the battery case 13 through the lid 14.

The high rigidity portion 15c is made of, for example, a resin having a rigidity higher than the rigidity of the low rigidity portion 15b. The high rigidity portion 15c has a rigidity higher than the rigidity of another portion of the exhaust duct 15 (battery coupling portion 15a, low rigidity portion 15b, external piping portion 15d).

The external piping portion 15d is disposed outside the battery case 13 to extend substantially in the left-right direction. The external piping portion 15d has one end coupled to the high rigidity portion 15c, and the other end being open to the outside of the vehicle 1.

In the battery pack 4, air is introduced into the battery case 13 by a fan (not illustrated), and the introduced air mainly cools the battery 11. The air warmed by cooling the battery 11 is discharged to the outside of the vehicle 1 through the exhaust duct 15. That is, the heat generated from the battery 11 is discharged to the outside of the vehicle 1 through the exhaust duct 15.

A cross member 31 disposed to extend in the left-right direction is attached to the lid 14. Both ends of the cross member 31 are placed on the rib 13c and the rib 13d, and the cross member 31 is fixed to the rib 13c and the rib 13d with fastening bolts (not illustrated) or the like. Alternatively, the cross member 31 may be fixed to the vehicle body frames 21.

The cross member 31 is disposed forward of the high rigidity portion 15*c* of the exhaust duct 15. The rearmost side of the cross member 31 is located rearward of the rearmost side of the battery 11.

The cross member 31 has a thickness smaller in the up-down direction than the thickness of the high rigidity portion 15*c* in the up-down direction. The cross member 31 is disposed so as to entirely overlap the high rigidity portion 15*c* in the up-down direction.

Three seat hinges 32 (32*a* to 32*c*) for supporting the rear seat 7 are provided on an upper portion of the battery pack 4 to extend in the front-rear direction. The seat hinge 32*a* is disposed along the left vehicle body frame 21. The seat hinge 32*b* is disposed at the center of the vehicle 1 in the left-right direction. The seat hinge 32*c* is disposed along the right vehicle body frame 21.

The seat hinges 32*a*, 32*b*, and 32*c* have front end portions disposed above the vehicle body cross member 22, and rear end portions disposed on the cross member 31. These end portions are fixed to the vehicle body cross member 22 and the cross member 31 with fastening bolts or the like (not illustrated).

Accordingly, when viewed from above, the battery 11 is surrounded by an 8-shaped structural body including the vehicle body cross member 22, the cross member 31, and the seat hinges 32*a*, 32*b*, and 32*c*. Hence, for example, when the vehicle 1 is collided from the rear (rear end collision), the battery 11 is protected by the 8-shaped structural body.

Thus, in the vehicle 1, damage to the battery 11 can be reduced. Moreover, in the vehicle 1, since the battery 11 is protected by the 8-shaped structural body, it is possible to reduce the possibility that the rear seat 7 moves, and it is also possible to reduce damage to an occupant sitting on the rear seat 7.

Figure 5:
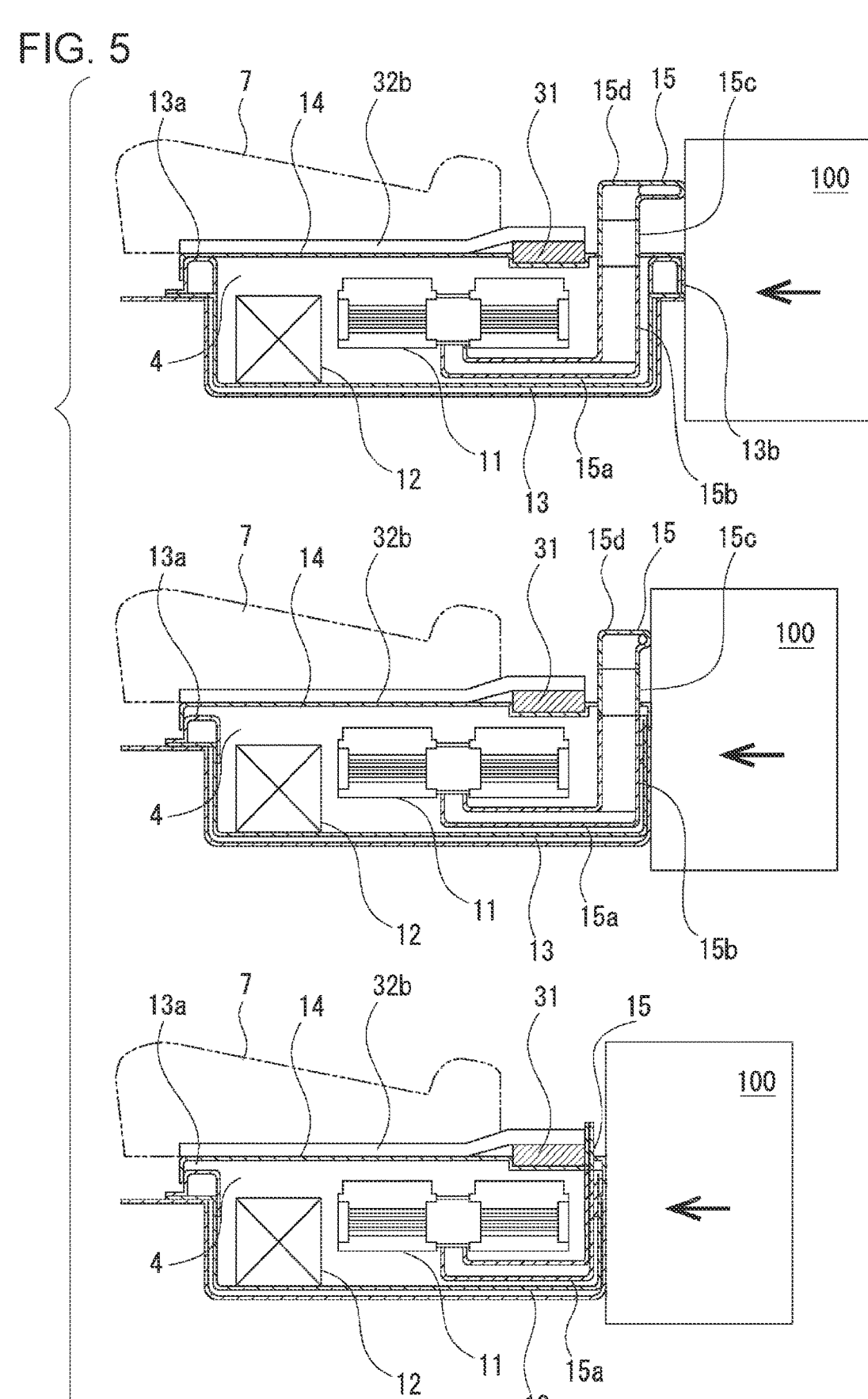
FIG. 5 provides views for explaining the vehicle in an event of a rear end collision.

FIG. 5 provides views for explaining the vehicle 1 in an event of a rear end collision. When the vehicle 1 is collided by an obstacle 100 from the rear, as illustrated in the upper part of FIG. 5, the obstacle 100 first comes into contact with the rib 13*b* of the battery case 13 in the vicinity of the battery 11. Then, the rib 13*b* of the battery case 13 is crushed to consume (reduce) collision energy by the obstacle 100. In this stage, since the low rigidity portion 15*b* and the high rigidity portion 15*c* are provided forward of the rib 13*b*, the low rigidity portion 15*b* and the high rigidity portion 15*c* are not deformed.

Thereafter, when impact energy cannot be received by the crushing of the rib 13*b*, the high rigidity portion 15*c* comes into contact with the obstacle 100 and is pushed forward as illustrated in the middle part of FIG. 5. At this time, since the high rigidity portion 15*c* is disposed so as to overlap the cross member 31 in the up-down direction, the high rigidity portion 15*c* pushed forward comes into contact with the cross member 31.

Then, when the high rigidity portion 15*c* is further pushed after coming into contact with the cross member 31, as illustrated in the lower part of FIG. 5, the high rigidity portion 15*c* is crushed to consume the collision energy by the obstacle 100.

At this time, since the high rigidity portion 15*c* is formed of a member having a rigidity higher than the rigidity of the low rigidity portion 15*b*, it is possible to increase the energy to be consumed when the high rigidity portion 15*c* is crushed, and it is possible to further consume the collision energy.

In contrast, even though the low rigidity portion 15*b* is pushed forward by the obstacle 100 and comes into contact with the battery 11, since the low rigidity portion 15*b* is formed of a member having a rigidity lower than the rigidities of the high rigidity portion 15*c* and the battery 11, it is possible to reduce the possibility that the battery 11 is damaged due to the crushing of the low rigidity portion 15*b*.

The above-described embodiment is an example for implementing the disclosure, and the disclosure is not limited to the above-described example, and various modifications can be considered.

For example, in the above-described embodiment, the battery 11 is surrounded by the 8-shaped structural body including the vehicle body cross member 22, the cross member 31, and the seat hinges 32. However, the structural body is not limited to the 8-shaped structural body, and for example, the battery 11 may be surrounded by a quadrangular structural body in which the seat hinge 32*b* is omitted.

Moreover, In the above-described embodiment, the battery 11 is disposed below the rear seat 7. However, the position of the battery 11 is not limited thereto, and, for example, the battery 11 may be disposed below a trunk room.

Further, in the above-described embodiment, the exhaust duct 15 has been described as an example of a duct for circulating air inside and outside the battery 11. However, the exhaust duct 15 may be used as an intake duct for allowing air to flow into the battery 11 from the outside without changing the configuration. That is, the duct for circulating the air inside and outside the battery 11 may be an exhaust duct or an intake duct.

As described above, a vehicle 1 according to the embodiment includes a battery 11; a cross member 31 provided rearward of the battery 11 to extend in a left-right direction; and a duct (exhaust duct 15) configured to circulate air inside and outside the battery 11. The duct (exhaust duct 15) includes a high rigidity portion 15*c* located rearward of the cross member 31 and having a rigidity higher than a rigidity of another portion (battery coupling portion 15*a*, low rigidity portion 15*b*, external piping portion 15*d*) of the duct (exhaust duct 15).

Accordingly, in the vehicle 1, the high rigidity portion 15*c* comes into contact with the cross member 31 and is crushed in an event of a rear end collision, and hence collision energy in the event of the rear end collision can be consumed by the crushing of the high rigidity portion 15*c*.

Accordingly, in the vehicle 1, damage to the battery 11 can be reduced. Moreover, in the vehicle 1, since the collision energy is consumed by the crushing of the high rigidity portion 15*c*, it is possible to reduce the possibility that the battery 11 moves forward. Thus, safety of the vehicle 1 can be improved.

Moreover, the high rigidity portion 15*c* is disposed so as to overlap the cross member 31 in an up-down direction.

Accordingly, in the vehicle 1, the high rigidity portion 15*c* can appropriately come into contact with the cross member 31 in an event of a rear end collision. Thus, in the event of the rear end collision, the high rigidity portion 15*c* can be appropriately crushed to consume the collision energy.

Moreover, the duct (exhaust duct 15) includes a low rigidity portion 15*b* located rearward of the battery 11 and having a rigidity lower than the rigidity of the high rigidity portion 15*c*.

Accordingly, in the vehicle 1, since the low rigidity portion 15*b* comes into contact with the battery 11 in an event of a rear end collision, it is possible to reduce the possibility that the battery 11 is damaged when the low rigidity portion 15*b* is pushed forward and crushed. Thus, the safety of the vehicle 1 can be further improved.

Moreover, the low rigidity portion 15*b* is disposed so as to overlap the battery 11 in an up-down direction.

Accordingly, in the vehicle 1, the low rigidity portion 15*b* can appropriately come into contact with the battery 11 in an event of a rear end collision. Thus, it is possible to further reduce the possibility that the battery 11 is damaged when the low rigidity portion 15*b* is pushed forward and crushed in the event of the rear end collision.

Moreover, the vehicle 1 includes seat hinges 32*a*, 32*b*, and 32*c* disposed on both sides and at a center in the left-right direction of the battery 11 to extend in a front-rear direction, and a vehicle body cross member 22 disposed forward of the battery 11 to extend in the left-right direction. The seat hinges 32*a*, 32*b*, and 32*c*, the vehicle body cross member 22, and the cross member 31 form an 8-shaped structural body.

Accordingly, since the battery 11 is surrounded by the 8-shaped structural body, the battery 11 is protected by the 8-shaped structural body in an event of a rear end collision. Thus, in the vehicle 1, the damage to the battery 11 can be further reduced. In addition, the vehicle 1 can reduce the possibility that the rear seat 7 moves, and can reduce the possibility that an occupant sitting on the rear seat 7 is damaged.

According to the embodiment of the disclosure, safety can be improved.

The invention claimed is:

1. A vehicle comprising:
   a battery;
   a cross member provided rearward of the battery to extend in a left-right direction of the vehicle; and
   a duct configured to circulate air inside and outside the battery,
   wherein the duct comprises a high rigidity portion located rearward of the cross member and having a rigidity higher than a rigidity of another portion of the duct.

2. The vehicle according to claim 1,
   wherein the high rigidity portion is disposed so as to overlap the cross member in a front-rear direction of the vehicle.

3. The vehicle according to claim 2, further comprising:
   seat hinges disposed on both sides of the battery and at a center of the battery in the left-right direction, the seat hinges extending in a front-rear direction of the vehicle; and
   a vehicle body cross member disposed forward of the battery and extending in the left-right direction,
   wherein the seat hinges, the vehicle body cross member, and the cross member form an 8-shaped structural body.

4. The vehicle according to claim 1,
   wherein the duct comprises a low rigidity portion as the another portion of the duct, the low rigidity portion located rearward of the battery and having a rigidity lower than the rigidity of the high rigidity portion.

5. The vehicle according to claim 4,
   wherein the low rigidity portion is disposed so as to overlap the battery in a front-rear direction of the vehicle.

6. The vehicle according to claim 1, further comprising:
   seat hinges disposed on both sides of the battery and at a center of the battery in the left-right direction, the seat hinges extending in a front-rear direction of the vehicle; and
   a vehicle body cross member disposed forward of the battery and extending in the left-right direction,
   wherein the seat hinges, the vehicle body cross member, and the cross member form an 8-shaped structural body.

* * * * *